RAYMOND J. SENGER
INVENTOR

June 4, 1963

R. J. SENGER 3,092,253

COMPONENT CHECKER

Filed Jan. 3, 1961

RAYMOND J. SENGER
*INVENTOR.*

BY

ATTORNEYS

June 4, 1963 R. J. SENGER 3,092,253
COMPONENT CHECKER
Filed Jan. 3, 1961 3 Sheets-Sheet 3

RAYMOND J. SENGER
INVENTOR.

BY
Flehr and Swain
ATTORNEYS

United States Patent Office 3,092,253
Patented June 4, 1963

3,092,253
COMPONENT CHECKER
Raymond J. Senger, Palo Alto, Calif., assignor to Develop-Amatic Engineering, a corporation of California
Filed Jan. 3, 1961, Ser. No. 80,446
3 Claims. (Cl. 209—81)

This invention relates to checking apparatus for various components and more particularly relates to checkers for such components as diodes which are packaged in roll form.

In the electronics industry many components are packaged by the manufacturer in the form of rolls whereby they are secured to an elongated strip of paper or other material. The strip, in turn, is wrapped about a reel. Frequently, when the purchaser receives the components in such fashion they have not been checked by the manufacturer or at least, have not been checked to the specifications required by the purchaser. The purchaser, then, may desire to check them himself. Moreover, it may be more convenient for the manufacturer himself to check the components after they are in the rolls than to check them individually.

This invention then, relates to apparatus for checking the components while they are in the roll form and further relates to an apparatus which not only check such components but separates the acceptable from the non-acceptable.

Heretofore components have generally been tested while in the individual state whereby each component has its leads placed into contact with testing terminals. After contact with the terminals a meter or some other device is read and the acceptability of the component is determined. From this determination a component is either discarded or retained, usually by an individual operator.

It is therefore, a general object of this invention to provide improved means for checking electronic components.

It is a more particular object of this invention to provide an apparatus for checking electronic components arranged in a roll form.

It is still another object of this invention to provide an apparatus for testing components and for discarding non-acceptable ones of the components.

It is a further object of this invention to provide an apparatus having the above mentioned characteristics which operates in an automatic fashion.

It is an other object of this invention to provide apparatus of the above mentioned character employing relatively few parts and, consequently, being economical to manufacture and use.

These and other objects of the invention will become more clearly apparent upon a review of the following description in conjunction with the accompanying drawing in which.

Figure 1:
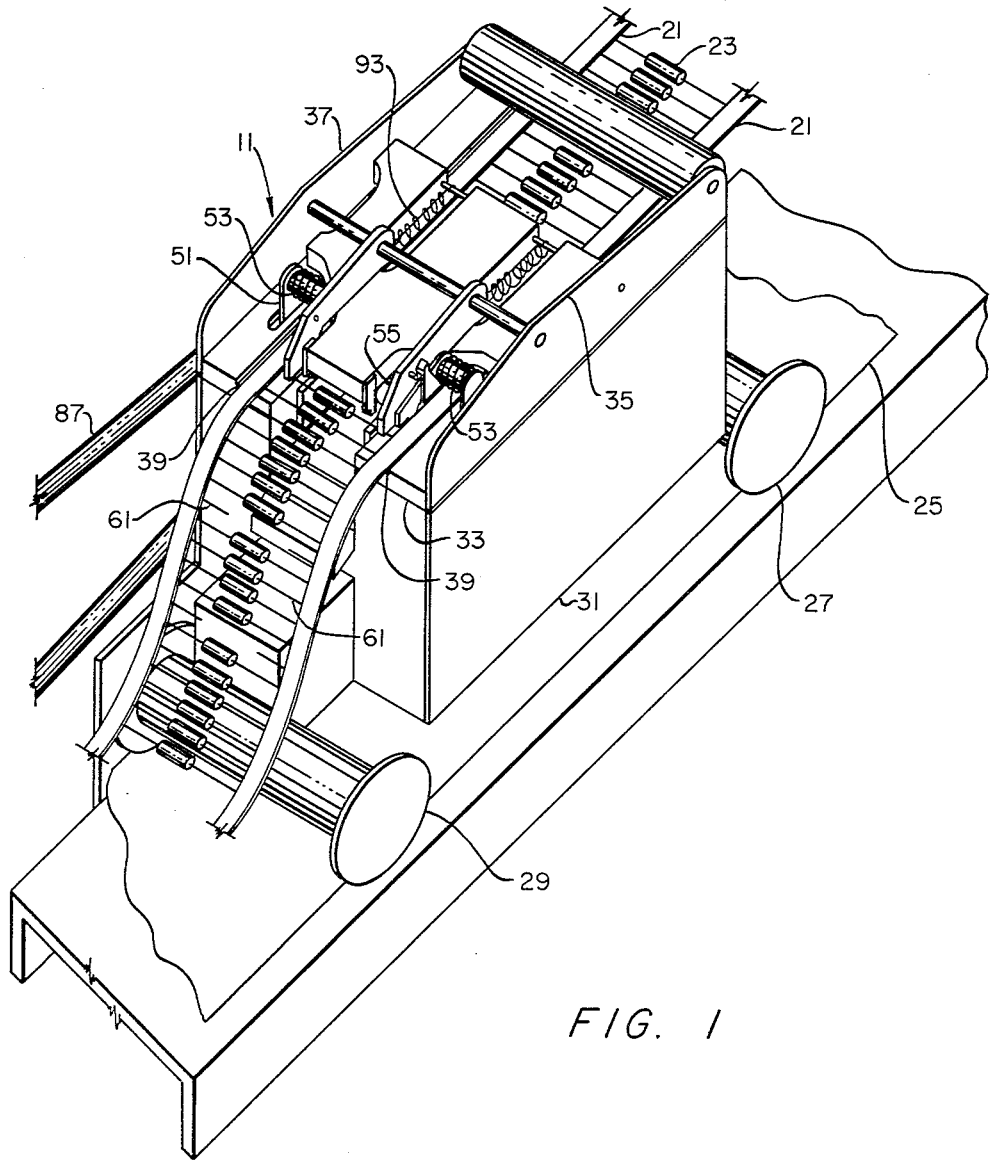
FIGURE 1 is a perspective view of the checking unit of a component checker in accordance with this invention.
Figure 2:
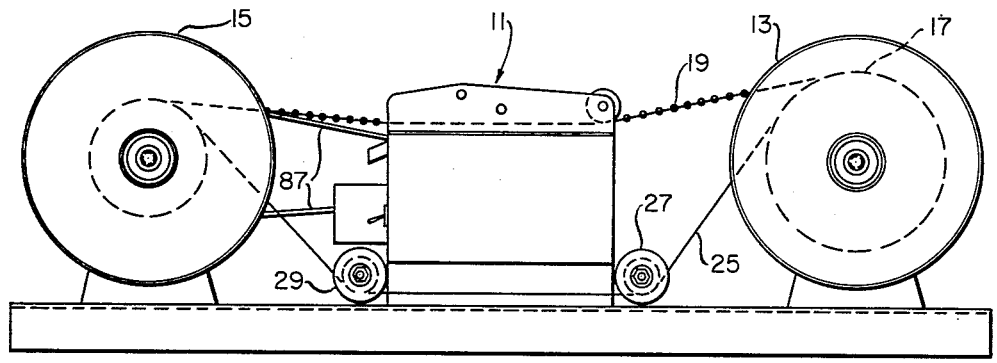
FIGURE 2 is a side elevational view of a component checker in accordance with this invention.

Referring particularly to FIGURES 1 and 2 it is seen that the component checker includes a checking unit 11 which is disposed between feed and take-up reel 13 and 15 respectively. A trip of components forming a roll 17 is retained by the feed reel 13 and extends in line 19 through the checking unit 11 to the take-up reel 15. The strip of components ordinarily includes a pair of parallel tapes 21 with a series of components 23 having their leads in adhesive contact with the tapes 21 themselves. Thus, as seen in FIGURE 1 the string of components takes the form of a rope ladder with the components and their leads as the rungs of the ladder.

In addition the reels of components ordinarily include a strip of paper 25 which is wound in a bifilar manner with strip of components. The strip of paper 25 may be conveniently extended below the checker unit 11 past the rollers 27 and 29 and again bifilarly wound on the take-up reel 15 with the strip of components.

Thus, it is seen that the component checker feeds the components 23 off of the feed reel 13, checks the components in the checking unit 11 and re-rolls the checked components onto the take-up reel 15. In the process of checking a component the checking unit 11 may be employed to cut out non-acceptable components and may also be employed to drive the take-up reel 15 whereby an excessive loop of components will not be caused between the checking unit 11 and the take-up reel 15 itself. A particular structure of these individual features will be explained hereinafter.

Figure 3:
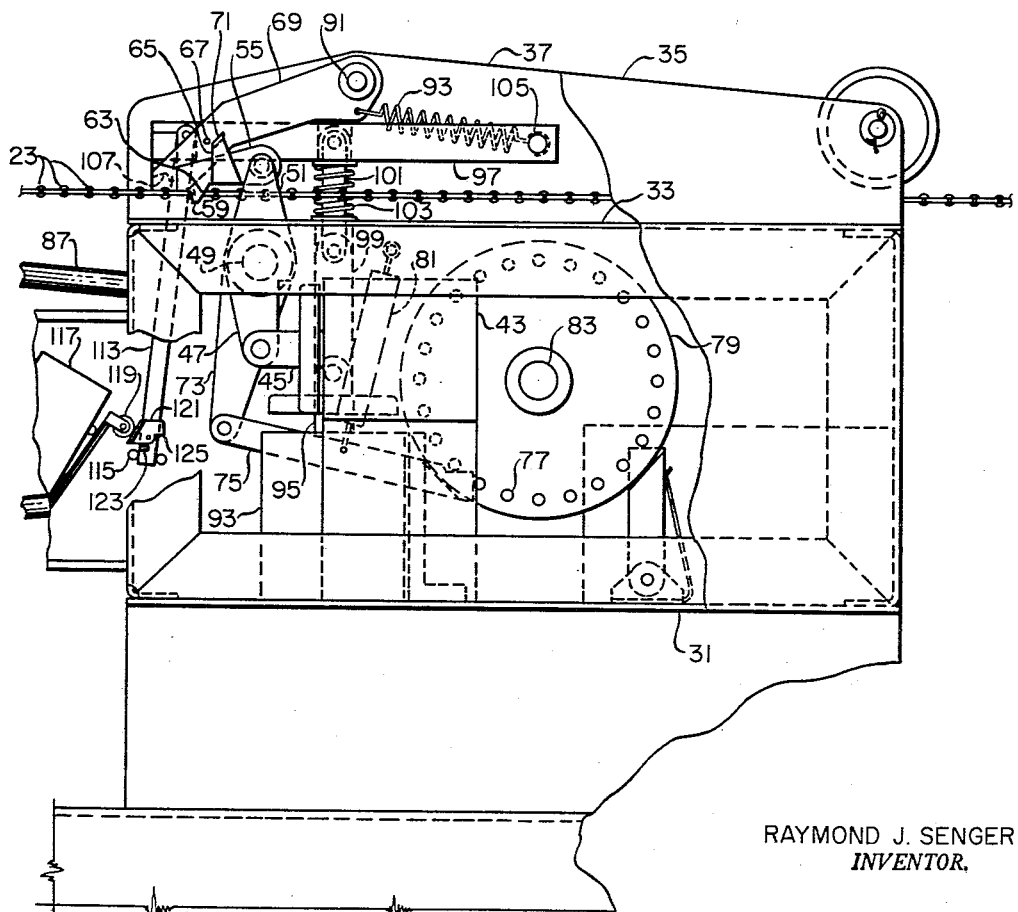
FIGURE 3 is an enlarged side elevational view of a checking unit in accordance with this invention.
Figure 4:
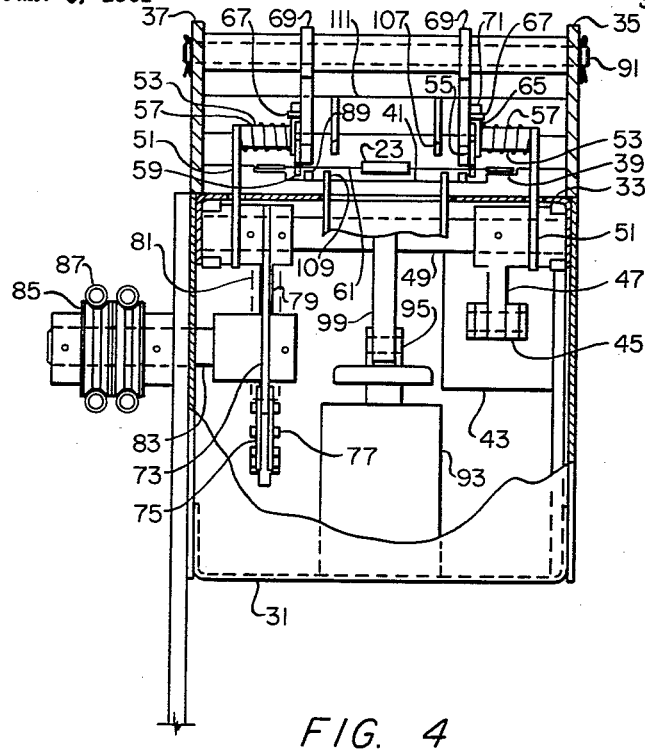
FIGURE 4 is a front elevational view of the checking unit shown in FIGURE 3.

Referring to FIGURES 1, 3 and 4 the checking unit itself comprises a chassis 31 having a top wall 33 and upwardly extending side walls 35 and 37. The top wall 33 includes a pair of tracks 39 upon which the tapes 21 may ride. A center track 41, through which the components 23 may pass without obstruction, is included between the tracks 39.

In order to advance the string of components from right to left as shown in FIGURE 3 an advance solenoid 43 is employed. The plunger 45 of the advance solenoid 43 is connected to one end of a crank 47 which is secured to a rotatable shaft 49. Also secured to the shaft 49, at opposite sides thereof, are a pair of crank arms 51 which extend upwardly through the top wall 33. Inwardly extending pins 53 are secured to the extremities of the crank arms 51. Arms 55 are pivoted about the inner portion of the pins 53 and are urged in a counter clockwise direction as shown in FIGURE 3 by means of springs 57. Dogs 59 are secured at the end of the arms 55 and extend downwardly between the leads 61 of the strip of components. Upon energization of the advance solenoid 43 the plunger 45 is drawn to the right as shown in FIGURE 3 thereby causing the cranks 47 and 51 to be rotated counter clockwise driving the dog 59 and the engaged strip of components to the left. Upon deenergization of the advance solenoid 43 the plunger 45 is returned to its left most position by spring or other means (not shown). The arms 55 along with the dogs 59 are returned to the right. Since the arms 55 are urged downward by means of the springs 57, wedge shaped reverse cam portions 63 are utilized on the return stroke to guide the dogs over the leads 61.

In the event that the particular component leads or strip of components are too light to permit the arm 55 to be drawn over the leads in a reverse direction an additional member 65 may be employed on each of the arms 55. The members 65 operate in conjunction with pins 67 on fingers 69. Additional operational features of the fingers 69 will be explained hereinafter. The members 65 include inwardly extending cams 71, which on the reverse stroke cooperate with the pins 67 to raise the arms 55 with a cam action. On the forward stroke the same inwardly extending cams 71 may be employed to urge the fingers 69 upward, clear of the leads 61, as will be explained hereinafter.

In addition to advancing the individual components the advance solenoid 43 also serves to advance the take-up reel 15. To this extent another crank 73 is secured to the shaft 49 and has a link 75 pivoted at the end thereof. The link 75 is urged into sequential engagement with the number of individual studs 77 on a wheel 79. A spring 81 urges the link 75 and the various studs into mating cooperation. Thus, upon repetitious activation of the advance solenoid 43, the link 75 and the studs 77 act as a ratchet to rotate the wheel 79 in a counterclockwise direction as shown in FIGURE 3. By thus rotating the wheel 79, the shaft 83 to which it is affixed is also rotated along with the pulleys 85. Drive means such as the belts 87 may be coupled to the pulleys 85 and to similar pulleys on the take-up reel 15. Thus, the take-up reel is positively rotated in proportion to the number of components advanced by the advance solenoid 43.

In order to actually test or check the various components, terminals 89 disposed on opposite sides of the component 23 (FIGURE 4) are provided in the track 41. In order to test one component at a time the terminals 89 have insufficient width to bridge the gap between adjacent components. The previously mentioned fingers 69 serve to periodically urge the component leads downward onto the terminals 89. To this end, the fingers 69 are pivoted about the shaft 91 and are urged in a counterclockwise direction by springs 93. As mentioned above the members 65 cooperate with the pins 67 to release and engage the dogs 59 between the component leads 61.

In addition to advancing and checking the components as they are passed through the checking unit the component checker may also eliminate those components which are defective. Consequently, a testing circuit of a known type is utilized which provides a signal upon determination of non-acceptable component. This signal may be known as a reject signal and is applied to a reject solenoid 93 having a plunger 95. The plunger 95 is connected to a cutter arm 97 by means of connecting links 99 and 101. The link 101 extends through the top wall 33 and is encircled by a spring 103 which is contained between the cutting blade 97 and wall 33 to urge the cutter arm 97 upward about its pivot shaft 105. The cutter arm 97 includes the cutting edge 107 at the outer end thereof which cooperates with the stationary cutting edges 109 to sever the leads 61 upon energization of the reject solenoid 93. Means such as a chute (not shown) may be provided beneath the stationary cutting edges 109 to receive the cut out components and to pass the same to a reject zone.

In addition, the testing circuit may provide an advance signal when an acceptable component is determined. This signal may be applied to the advance solenoid 43 to advance the strip of components. Thus far no means has been mentioned for advancing the strip of components when a non-acceptable component is found. In order to circumvent the requirement of having to reset the checker after detecting a non-acceptable component, additional means are provided for causing delayed advance signal upon the reception of the reject impulse. Thus, the moveable cutter arms 97 are joined by a bar 111 which has a link 113 coupled thereto (FIGURE 3). Guide means 115 are provided to assure relatively longitudinal movement of the link 113 upon descent of the cutting arms 97.

A switch 117 is provided and has its contact 119 in close proximity to the link 113. A clapper unit 121 is pivoted about the link 113 and is prevented from rotating in the counterclockwise direction (as shown in FIGURE 3) by a stop 123. However, clockwise rotation is permissible until a limit is reached by the contact of an ear 125 with the stop 123. Thus, upon the descent of the link 113 the clapper 121 is rotated out of position and the switch 117 is not activated. On the other hand, when the link returns to its upward position counterclockwise rotation is prevented and the switch 117 is activated to provide a signal. This signal may be applied to the advance solenoid through a delay circuit. The delay will provide sufficient time for the reject signal to cause severance of the non-acceptable component.

Figure 5:
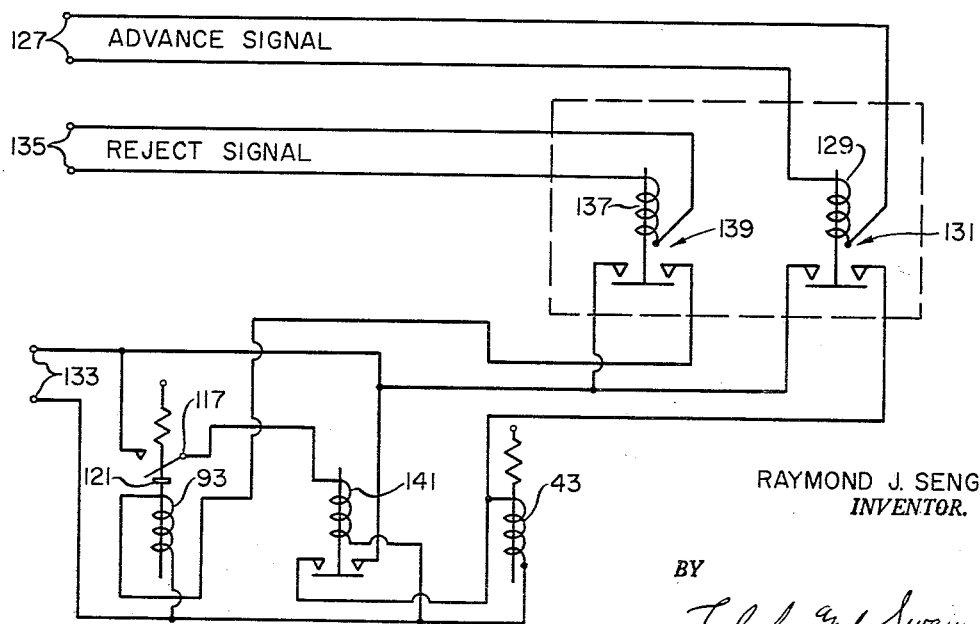
FIGURE 5 is a schematic diagram of the component checker shown in FIGURES 1–4.

Referring to FIGURE 5 a schematic diagram as used in accordance with the invention shown. In conjunction with the circuit as shown, an additional testing circuit is required to develop an advance signal when an acceptable component is determined and a reject signal when a non-acceptable component is determined. The terminals 127 which receive the advance signal are connected to the coil 129 of an advance relay 131. The advance relay serves, upon activation, to connect power from the terminals 133 to the advance solenoid 43. The solenoid 43 is engaged and the strip of components is advanced.

The terminals 135 receive the reject signal and pass the same to the coil 137 on the reject relay 139. The reject relay 139 serves to connect power from the terminals 133 to the reject solenoid 93 and thereby sever the non-acceptable component from the strip. On the return stroke of the reject solenoid plunger, the clapper 121 closes the switch 117 to apply power from the terminals 133 to a delay relay 141. Closing the delay relay 141 serves, in turn, to connect power from the terminals 133 to the advance solenoid 43. Thus, even upon receipt of the reject signal the advance solenoid is activated. The purpose of the delay relay being interposed before the advance solenoid is to permit the machine to have time to cut out the defective component and to return the cutter blades clear of subsequent components.

It is seen that an improved component checker is provided. The checker may operate entirely automatically with manual assistance required only to begin feeding the rolls through the checker unit itself. The checker serves not only to check the individual component but to separate the rejected components and to maintain the acceptable ones on the roll. Clearly, it is obvious that if it were desired to maintain the rejected components on the roll and to cut out the acceptable ones, it could be accomplished by mere reversal of the signals as applied to the reject and advance relays 131 and 139 respectively.

The principle of this invention may be employed to check various types of electronic components such as diodes, resistor, capacitors and so forth. Moreover, components having more than two leads may be so checked if they are packaged in roll or strip form. In addition mechanical or other components so arranged on strips may be checked by replacing the electrical terminals with mechanical connections. The reject and advance signals could be either electrical or mechanical.

I claim:

1. Apparatus for checking electrical components and for selecting those of said components having electrical characteristics within a preselected range, said electrical components being transversely secured to a pair of spaced tapes to form a string of components; said apparatus comprising terminal means for receiving said electrical components individually in electrical contact, said terminal means adapted to be connected to a circuit of the type which determines whether the component in contact with said terminal is within said preselected range and which generates a first signal when said component is within said range and a second signal when the component is outside said range, means for receiving said first signal, means responsive to the receipt of said first signal for advancing said string of components whereby succeeding ones of said components are received by said terminals, means for receiving said second signal, and means responsive to the receipt of said second signal for separating from said string of components, that component in electrical contact with said terminals at the time of receipt of said second signal.

2. Apparatus as defined in claim 1 wherein said last named means includes time delayed means for advancing said string of components.

3. Apparatus as defined in claim 2 wherein said means for advancing said string of components includes a first solenoid and said means for separating that component in contact with the terminals includes a second solenoid, a member connected for reciprocal movement with the operation of said second solenoid, a clapper unit disposed on said member, a switch disposed adjacent said clapper unit such that upon movement of said member in one direction only said switch is operated, the movement of said member in said one direction being caused by the operation of said second solenoid in its first direction, said component in contact with the terminals being separated from the strip of components upon operation of the second solenoid in its second direction, said switch being coupled to said first solenoid whereby the string of components is advanced at a delayed time after the component in contact with the terminals is separated.

References Cited in the file of this patent

UNITED STATES PATENTS 2,983,032     Pearson _____ May 9, 1961